United States Patent [19]

Ito et al.

[11] Patent Number: 5,210,752

[45] Date of Patent: May 11, 1993

[54] RADIO TELE-COMMUNICATION SYSTEM USING MULTICHANNEL ACCESS SCHEME

[75] Inventors: Koichi Ito; Masayuki Tanaka; Yuji Umemoto, all of Tokyo, Japan

[73] Assignee: Kabushiki Kaisha Toshiba, Kanagawa, Japan

[21] Appl. No.: 729,203

[22] Filed: Jul. 12, 1991

[30] Foreign Application Priority Data

Jul. 12, 1990 [JP] Japan ................................ 2-184612

[51] Int. Cl.⁵ .......................... H04J 3/16; H04J 3/12; H04Q 7/00; H04B 7/00
[52] U.S. Cl. ................................ 370/95.1; 370/110.1; 379/59; 455/33.1
[58] Field of Search ................... 370/95.1, 95.3, 110.1, 370/85.7; 379/59, 60; 455/33.1, 33.4

[56] References Cited

U.S. PATENT DOCUMENTS

| 4,850,033 | 7/1989 | Eizenhöfer et al. | 455/33.2 |
| 4,949,395 | 8/1990 | Rydbeck | 370/95.3 |
| 5,081,623 | 1/1992 | Ainscow | 370/85.2 |
| 5,081,704 | 1/1992 | Umeda et al. | 370/95.3 |

Primary Examiner—Douglas W. Olms
Assistant Examiner—Min Jung
Attorney, Agent, or Firm—Banner, Birch, McKie & Beckett

[57] ABSTRACT

In a radio tele-communication system of this invention, each mobile station is designed to determine whether a control radio frequency can be used and to determine whether any free time slots are included in the time slots of a plurality of speech radio frequencies. A calling operation is performed by selecting a radio channel for the calling operation from the free time slots of the plurality of speech radio frequencies and the control radio frequency on the basis of the determination results.

12 Claims, 10 Drawing Sheets

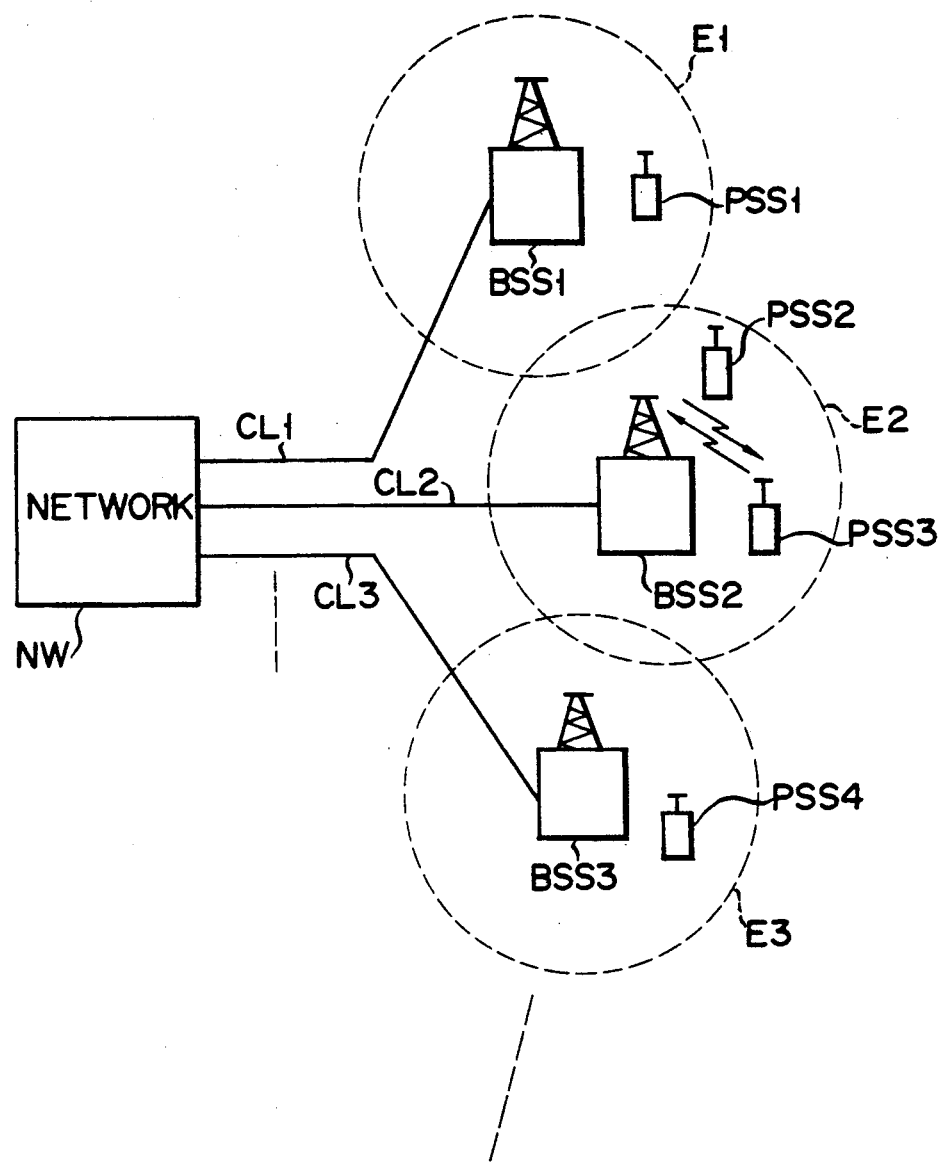
F I G. 1

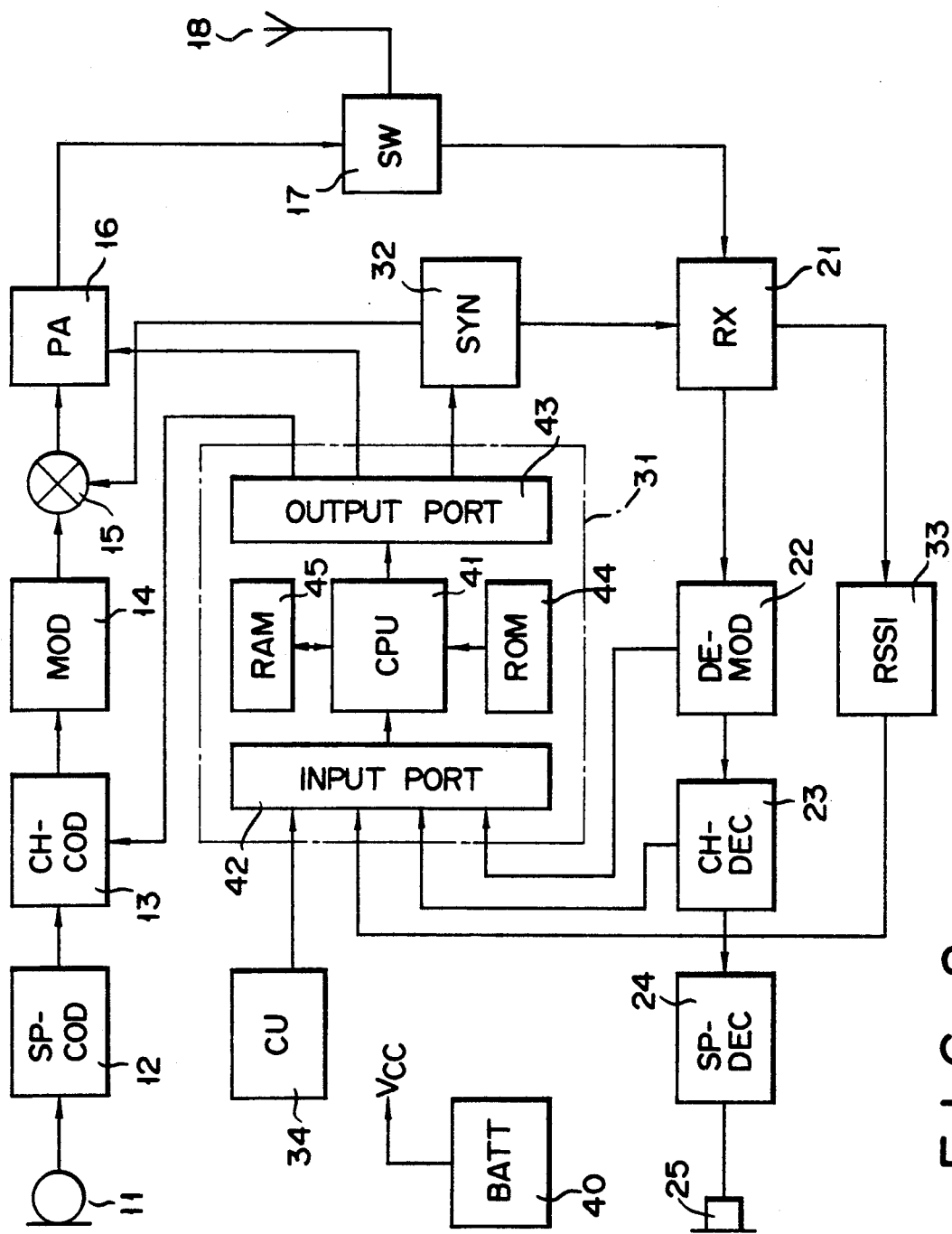
F I G. 2

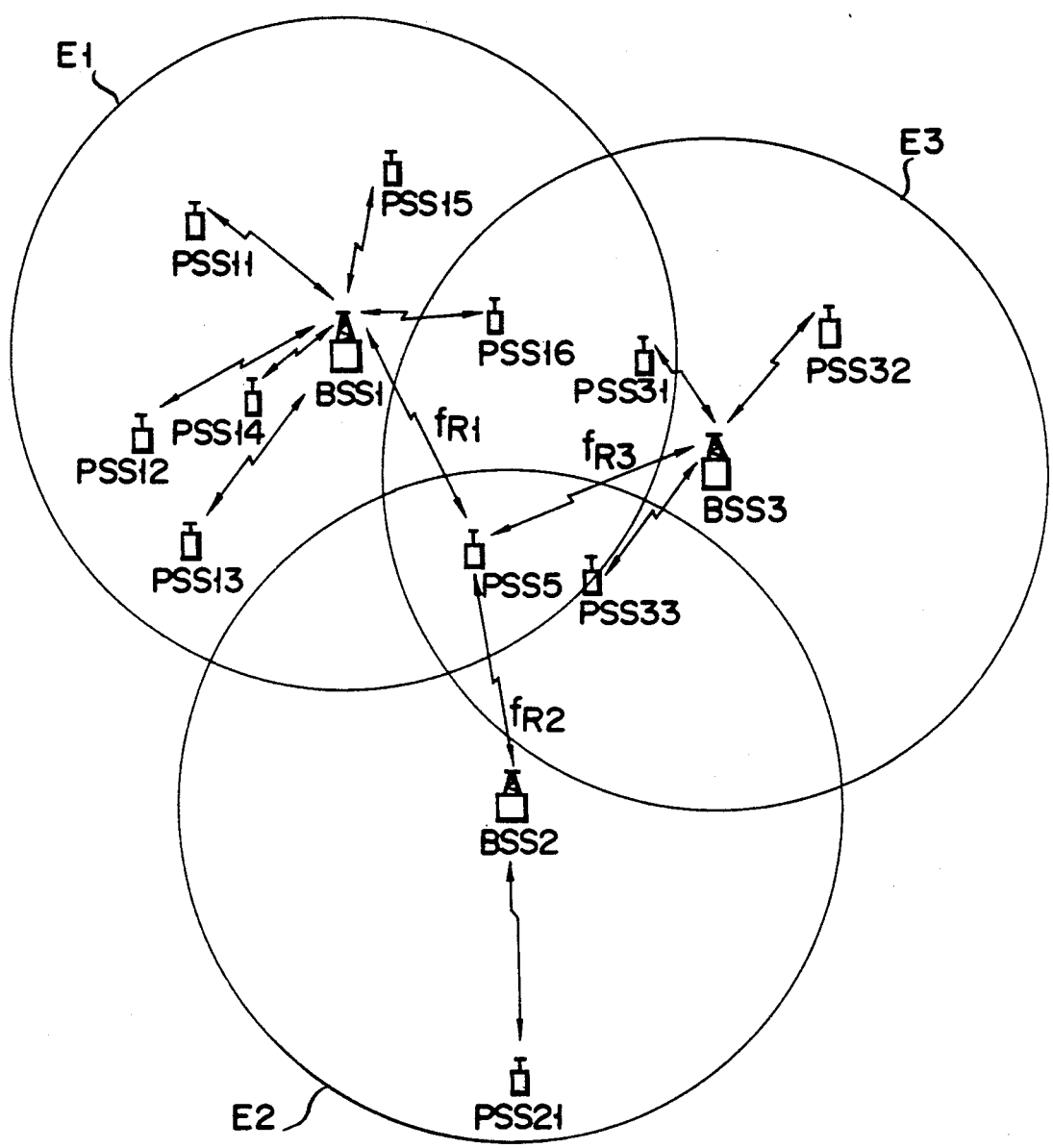
F I G. 5

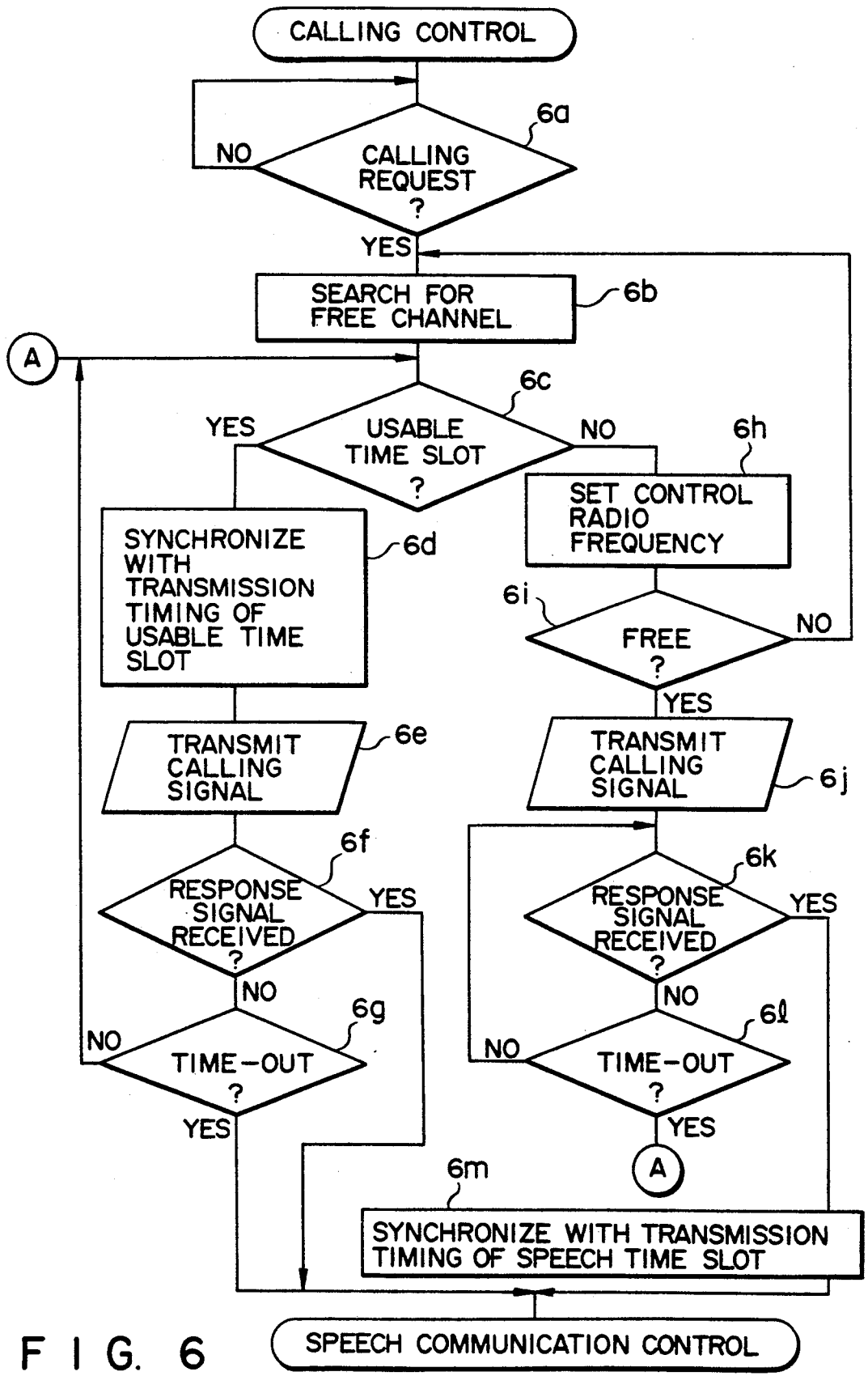
F I G. 6

RADIO TELE-COMMUNICATION SYSTEM USING MULTICHANNEL ACCESS SCHEME

BACKGROUND OF THE INVENTION

1. Field of the Invention

The present invention relates to a radio tele-communication system such as a portable radio telephone system or a vehicle telephone system and, more particularly, to a system employing a multichannel access scheme as a radio channel access scheme.

2. Description of the Related Art

As a system of this type, for example, a cellular radio telephone system is available. FIG. 10 shows a schematic arrangement of a cellular radio telephone system.

This system comprises a control station CS, a plurality of base stations BS1 to BSn, and a plurality of mobile stations PS1 to PSm. The control station CS is connected to a wire network NW. The plurality of base stations BS1 to BSn are connected to the control station CS through wire lines CL1 to CLn, respectively. The base stations BS1 to BSn form radio zones E1 to En in different areas. The plurality of mobile stations PS1 to PSm are connected through radio channels to the base stations in the radio zones in which they are located and are further connected to the wire network NW through the base stations and the control station CS.

This system employs a multichannel scheme for accessing radio frequencies. In the multichannel access scheme, a plurality of speech radio frequencies and a small number of control radio frequencies are shared by the base stations BS1 to BSn and the mobile stations PS1 to PSm. When a calling signal is generated by a given mobile station or a ringing signal is received from the wire network NW, a free speech radio frequency and a free control radio frequency are selected from these speech radio frequencies and control radio frequencies, thus performing radio communication between the mobile and base stations.

Assume that a calling operation is performed by a given mobile station. In this case, in the mobile station, a free control radio frequency is selected from the small number of control radio frequencies. The selected control radio frequency is used as a control channel, and communication of a control signal associated with a calling or ringing operation is performed between the mobile station and the corresponding base station. At this time, in the control station, a free speech radio frequency is selected from the plurality of speech radio frequencies. Thereafter, radio channel designation information representing the selected free speech control radio frequency is inserted in the control signal to be transmitted from the base station to the mobile station. Subsequently, speech communication can be performed between the mobile and base stations by using the free speech radio frequency as a speech channel.

In a system of this type, the most important subject is associated with an increase in office service capacity.

Under the circumstances, a TDMA scheme has recently been proposed as a scheme for accessing radio channels between base stations and mobile stations. In the TDMA scheme, a signal to be transmitted at each speech radio frequency is formatted to have a time frame. One time frame is constituted by six time-divisionally multiplexed time slots. The time slots of each speech radio frequency are respectively assigned, as speech channels, to mobile stations. The respective mobile stations perform radio communication with corresponding base stations by using the time slots assigned to them. If this TDMA scheme is employed, the office service capacity can be increased six times that of a conventional system.

In the TDMA scheme, however, with an increase in office service capacity, it is expected that the frequency of calling control or ringing control substantially simultaneously performed between mobile stations and base stations, i.e., the control traffic, is increased. In general, the number of control channels which a system possesses is small. For this reason, the number of control channels tends to be insufficient for the control traffic of the system, resulting in an increase in the number of times that the start timing of radio channel connection control is delayed or a radio channel is busy in response to a calling or ringing request.

The easiest method of increasing the number of control channels is a method of increasing the number of control radio frequencies. This method, however, is difficult to realize because the radio bandwidth which can be used by a system is limited. Even if such a method can be realized, control channels cannot be effectively used in a time zone in which the control traffic is low. Therefore, this method is not preferable in terms of the utilization efficiency of a frequency.

SUMMARY OF THE INVENTION

It is an object of the present invention to provide a radio tele-communication system which can satisfactorily respond to an increase in control traffic without preparing a large number of control radio frequencies, and can effectively use radio frequencies.

It is another object of the present invention to provide a radio tele-communication system in which each mobile station can select a proper time slot, of a speech radio frequency, which has a high probability of a free state, as a control channel.

It is still another object of the present invention to provide a radio tele-communication system in which a time slot, of a speech radio frequency, which is selected as a control channel by each mobile station can be easily confirmed in a corresponding base station, thereby allowing selection of a further proper time slot of a speech radio frequency.

It is still another object of the present invention to provide a mobile station apparatus which can reliably select a radio channel used for a calling operation even if control traffic is high, thereby always performing smooth radio connection control.

In order to achieve the above objects, according to the present invention, there is provided a radio tele-communication system, wherein in each mobile station, first free state determining means checks whether the control radio frequency can be used, second free state determining means checks whether each time slot of a plurality of speech radio frequencies is free, and calling control means performs a calling operation by selecting a radio channel used for the calling operation from free time slots of the plurality of speech radio frequencies and the control radio frequency on the basis of determination results from the first and second free state determining means.

With this arrangement, a radio channel used for a calling operation is selected not only from control radio frequencies but also from free time slots of speech radio frequencies. Therefore, even if only a small number of control radio frequencies are available and control traffic is high because of the concentration of many calling and ringing operations, a radio channel for a calling operation can be reliably selected. This allows reliable execution of a calling operation without cancellation. In addition, since the number of control radio frequencies need not be increased, and a free time slot of a speech radio frequency is used, a limited number of radio frequencies can be effectively used.

That is, a radio tele-communication system having good response characteristics with respect to calling and ringing operations and capable of effectively using radio frequencies can be provided.

When a radio channel is to be selected by the calling control means, a free time slot of a speech radio frequency may be preferentially selected, and a control radio frequency may be selected only if no free time slot is present. In contrast to this, if a control radio frequency can be used, the control radio frequency may be preferentially selected, and a free time slot of a speech radio frequency may be selected if the control radio frequency cannot be used.

If the free time slots of the speech radio frequencies are preferentially selected, most calling control can be performed by using the free time slots of the speech radio frequencies. For this reason, when transmission of a dial signal and speech communication are to be performed upon completion of calling control, the time slot used for the calling control can be used, so that switching from the control radio frequency to a free time slot of a speech radio frequency need not be performed. Therefore, the time required for connection control can be shortened accordingly.

In addition, according to another characteristic feature of the radio tele-communication system of the present invention, selection of a free time slot of a speech radio frequency is performed in the following manner. A speech radio frequency having a currently used time slot with a reception field strength equal to or more than a preset first determination level is selected from a plurality of speech radio frequencies. A time slot having a reception field strength less than a second determination level below the first determination levels is then selected, as a free time slot, from time slots of the selected speech radio frequency.

With this arrangement, a speech radio frequency having a low reception field strength is removed even if reception of a wave at this radio speech frequency is confirmed, and only a speech radio frequency having a sufficiently high reception field strength is selected. A time slot having a sufficiently low reception field strength is selected, as a free time slot, from this speech radio frequency having the sufficiently high reception field strength. Even if, therefore, a wave of the same speech radio frequency as that used in another base station arrives at an interference wave, this interference wave is neglected, and a wave having a sufficiently high reception field strength can be selected as a desired wave. That is, a sufficiently high D/U can be ensured, and a free time slot can be reliably selected.

Furthermore, the present invention is characterized in that when a plurality of speech radio frequencies having currently used time slots whose reception field strengths are equal to or more than the first determination level and free time slots whose reception field strengths are less than the second determination level are detected, a calling operation is performed by selecting a free time slot of a speech radio frequency having the highest reception field strength from the detected speech radio frequencies.

With this operation, a time slot having a higher probability of free state can be selected.

In a mobile station apparatus of the present invention, first free state determining means checks whether the control radio frequency can be used, second free state determining means checks whether each time slot of a plurality of speech radio frequencies is free, and calling control means performs a calling operation by selecting a radio channel used for the calling operation from free time slots of the plurality of speech radio frequencies and the control radio frequency on the basis of determination results from the first and second free state determining means.

According to the present invention, therefore, each mobile station can reliably select a radio channel used for a calling operation even if the control traffic of a control channel is high, thus allowing smooth radio connection control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an arrangement of a portable radio telephone system according to an embodiment of the present invention;

FIG. 2 is a block diagram showing an arrangement of each mobile station in the system shown in FIG. 1;

FIGS. 4A to 4C are timing charts showing the formats of signals to be transmitted at speech radio frequencies;

FIG. 5 is a view for explaining an operation of the system shown in FIG. 1;

FIG. 6; is a flow chart showing the control sequence and contents of a control circuit of each mobile station;

DETAILED DESCRIPTION OF THE PREFERRED EMBODIMENT

An embodiment in which the present invention is applied to a portable radio telephone system will be described first.

Figure 4A:
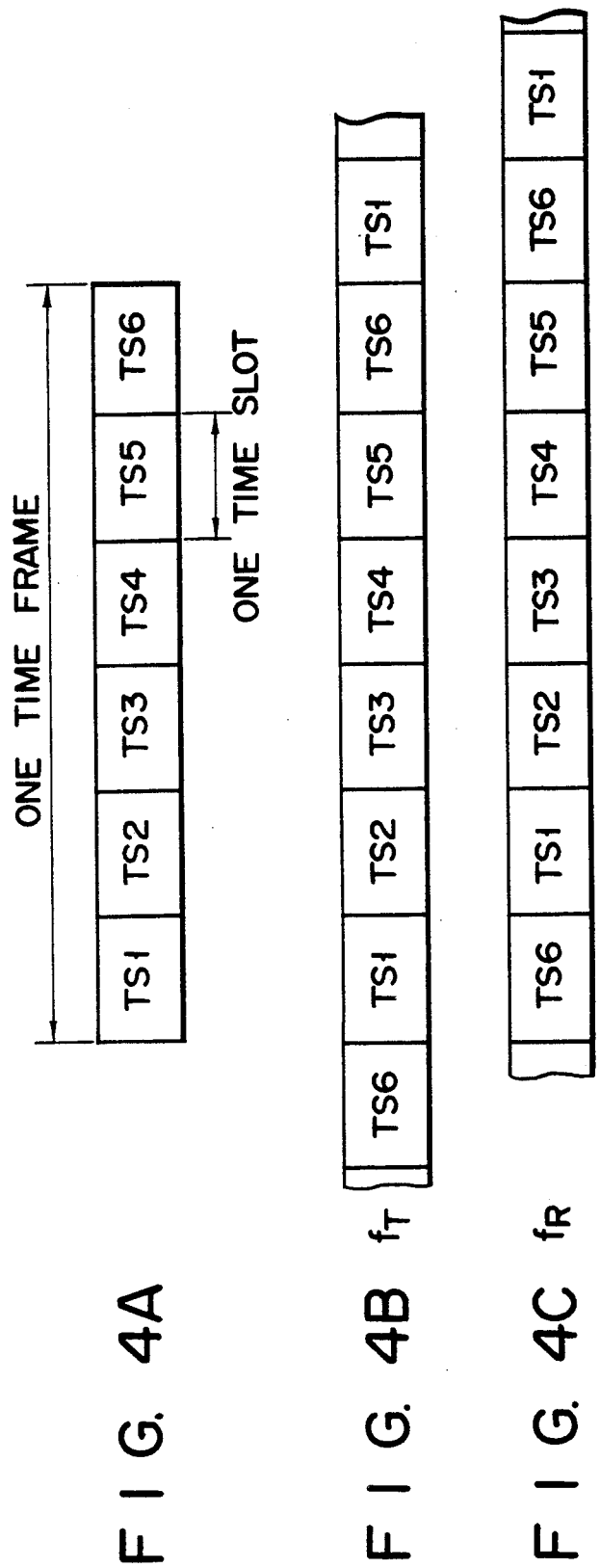

FIGS. 4A to 4C show the formats of signals to be transmitted at speech radio frequencies. One time frame is time-divisionally divided into six time slots TS1 to TS6, as shown in FIG. 4A. In the system of this embodiment, the time slots of a speech radio frequency having such a format are independently assigned as pairs of transmission and reception frequencies, as shown in, e.g., FIGS. 4B and 4C.

FIG. 1 is a block diagram showing the arrangement of the portable radio telephone system of this embodiment. The system comprises a plurality of base stations BSS1 to BSSn and a plurality of mobile stations PSS1 to PSSm. The base stations BSS1 to BSSn are connected to a wire network NW through wire lines CL1 to CLn, respectively. The base stations BSS1 to BSSn form radio zones E1 to En in different areas. The mobile stations PSS1 to PSSm are connected to the corresponding base stations through radio channels within the radio zones E1 to En formed by the base stations BSS1 to BSSn.

FIG. 2 is a block diagram showing the arrangement of each of the mobile stations PSS1 to PSSm. Each of the mobile stations PSS1 to PSSm is roughly divided into a transmission system, a reception system, and a control system. Note that reference numeral 40 denotes a battery as a power source.

The transmission system comprises a transmitter 11, a speech coder (SP-COD) 12, an error correction coder (CH-COD) 13, a digital modulator (MOD) 14, a multiplier 15, a power amplifier (PA) 16, a high-frequency switch (SW) 17, and an antenna 18. The speech coder 12 codes an analog transmission speech signal output from the transmitter 11. The error correction coder 13 performs error correction coding of the coded transmission speech signal output from the speech coder 12 and of a coded control signal output from a control circuit 31 (to be described later). The digital modulator 14 generates an IF signal modulated by the coded transmission speech signal output from the error correction coder 13. For example, a $\pi/4$ shifted QPSK scheme is used as a modulation scheme. In the multiplier 15, the IF signal is mixed with a local oscillation signal output from a frequency synthesizer 32 to be formed into a high-frequency transmission signal. In the power amplifier 16, the high-frequency transmission signal output from the multiplier 15 is amplified to have a predetermined transmission power. The high-frequency switch 17 is kept ON only during a period corresponding to a transmission time slot designated by the control circuit 31. During this period, the radio transmission signal output from the power amplifier 16 is supplied to the antenna 18 to be transmitted to a corresponding one of the base stations BSS1 to BSSm.

The reception system comprises a receiver (RX) 21, a digital demodulator (DEM) 22, an error correction decoder (CH-DEC) 23, a speech decoder (SP-DEC) 24, and a telephone receiver 25. In the receiver 21, a high-frequency reception signal received in a predetermined time slot is frequency-converted into an IF signal. The digital demodulator 22 establishes bit and frame synchronization with respect to the reception IF signal output from the receiver 21, and demodulates it into a coded reception signal. Note that information associated with the above-mentioned synchronization establishment is supplied to the control circuit 31. The error correction decoder 23 performs error correction decoding of the coded modulated signal output from the digital demodulator 22. Thereafter, a coded reception speech signal obtained by this error correction decoding is output to the speech decoder 24, and the coded control signal is supplied to the control circuit 31. The speech decoder 24 decodes the coded reception speech signal. As a result, the analog reception speech signal restored by this decoding operation is amplified and output from the telephone receiver 25.

The control system comprises the control circuit (CONT) 31, the frequency synthesizer (SYN) 32, a reception field strength detector (RSSI) 33, and a console unit (CU) 34. The frequency synthesizer 32 generates a local oscillation frequency corresponding to a radio channel designated by the control circuit 31. The reception field strength detector 33 detects the reception field strength of a radio wave transmitted from each of the base stations BSS1 to BSSn, and supplies the detection signal to the control circuit 31. The console unit 34 includes a transmission switch, dial keys, a liquid crystal display, and the like.

The control circuit 31 is constituted by, e.g., a microcomputer. This microcomputer includes a central processing unit (CPU) 41, an input port 42, an output port 43, a program ROM 44, and a data RAM 45. The CPU 41 executes a predetermined control operation in accordance with a program stored in the program ROM 44 in advance.

Figure 3:
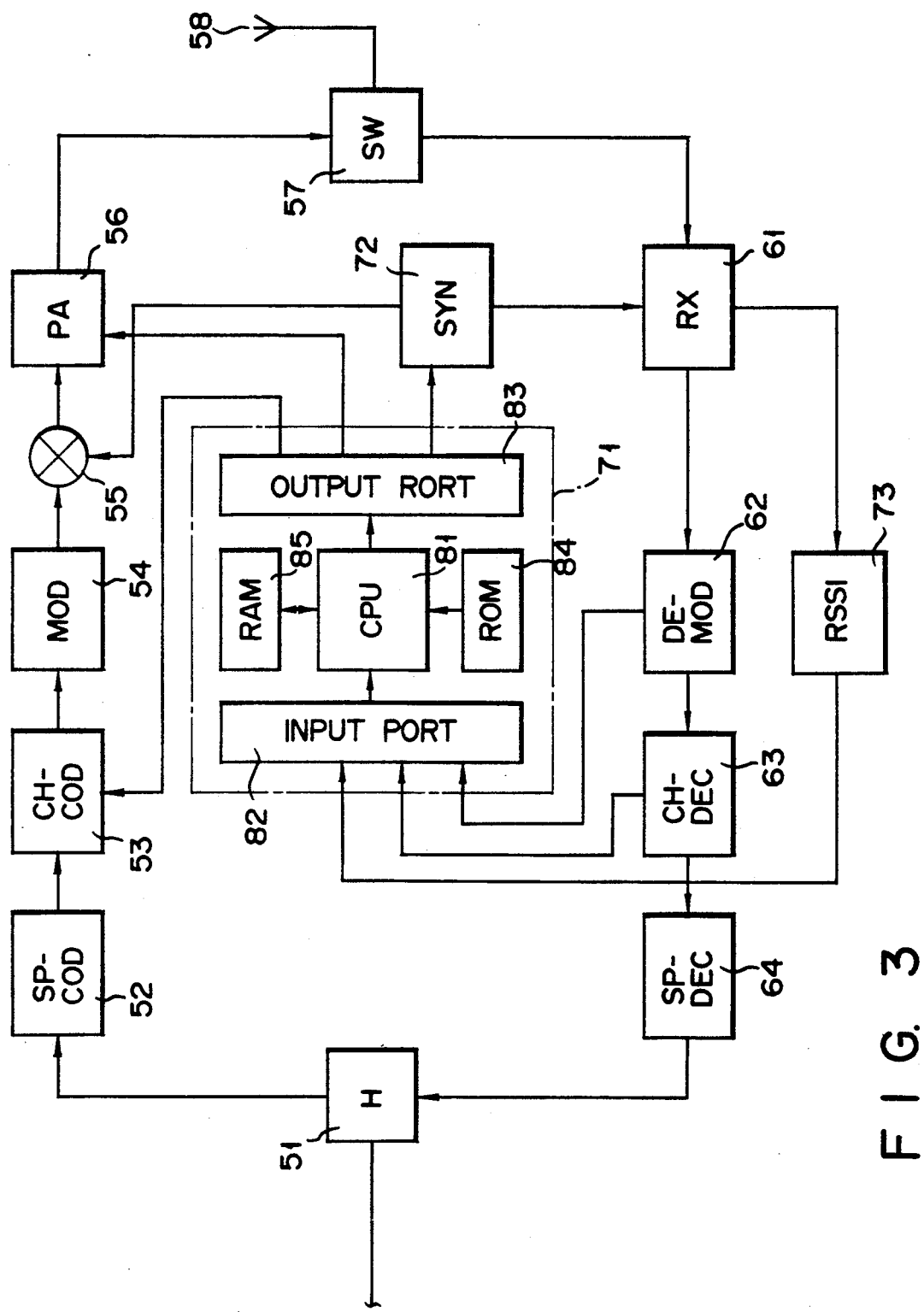
FIG. 3 is a block diagram showing an arrangement of each base station in the system shown in FIG. 1.

Each of the base stations BSS1 to BSSn has an arrangement shown in FIG. 3. Similar to the mobile stations PSS1 to PSSm, each of the base stations BSS1 to BSSn is roughly divided into a transmission system, a reception system, and a control system.

The transmission system comprises a hybrid circuit 51, a speech coder (SP-COD) 52, an error correction coder (CH-COD) 53, a digital modulator (MOD) 54, a multiplier 55, a power amplifier (PA) 56, a high-frequency switch (SW) 57, and an antenna 58. The speech coder 52 codes an analog speech signal transmitted from the wire network side. The error correction coder 53 performs error correction coding of the coded speech signal output from the speech coder 52 and a digital control signal output from a control circuit 71 (to be described later). The digital modulator 54 generates a modulated IF signal modulated by the coded transmission speech signal output from the error correction coder 53. For example, a $\pi/4$ shifted QPSK ($\pi/4$ shifted differentially encoded quadrature phase shift keying) scheme is used as a modulation scheme. In the multiplier 55, the IF signal is multiplied by a local oscillation signal output from a frequency synthesizer 72 to be converted into a high-frequency transmission signal. The high-frequency transmission signal output from the multiplier 55 is amplified by the power amplifier 56 to have a predetermined transmission power. The high-frequency switch 57 is kept on only during a period corresponding to a transmission time slot designated by the control circuit 71. During this period, the radio transmission signal output from the power amplifier 56 is supplied to the antenna 58 to be transmitted to a corresponding on of the mobile stations PSS1 to PSSm.

The reception system comprises a receiver (RX) 61, a digital demodulator (DEM) 62, an error correction decoder (CHDEC) 63, and a speech decoder (SPDEC) 64. The receiver 61 performs frequency conversion of a radio reception signal received through the antenna 58 and the high-frequency switch 57 in a predetermined time slot. The digital demodulator 62 establishes bit and frame synchronization with respect to the reception IF signal output from the receiver 61, and demodulates it into a coded reception signal. Note that information associated with the above synchronization establishement is supplied to the control circuit 17. The error correction decoder 63 performs error correction decoding of the digital demodulated signal output form the digital demodulator 62. The coded speech signal obtained by this error correction decoding is output to the speech decoder 64, while the coded control signal is supplied to the control circuit 71. The speech decoder 64 decodes the coded speech signal. The analog speech signal restored by this decoding operation is transmitted to a corresponding one of the wire lines CL1 to CLn through the hybrid circuit 51.

The control system comprises the control circuit (CONT) 71, the frequency synthesizer (SYN) 72, and a reception field strength detector (RSSI) 73. The frequency synthesizer 72 generates a local oscillation frequency corresponding to a radio channel designated by the control circuit 71. The reception field strength detector 73 detects the reception field strength of a radio transmission signal transmitted from a corresponding one of the mobile stations PSS1 to PSSm, and supplies the detection signal to the control circuit 71.

The control circuit 71 is constituted by, e.g., a microcomputer. This microcomputer includes a central processing unit (CPU) 81, an input port 82, an output port 83, a program ROM 84, and a data RAM 85. The CPU 81 executes a predetermined control operation in accordance with a program stored in the program ROM 84 in advance.

An operation of the portable radio telephone system having the above-described arrangement will be described below. Assume that the system is set in a state shown in FIG. 5. A calling operation performed by the mobile station PSS5 in this state will be exemplified below.

In a waiting state, the mobile station PSS5 monitors a calling request in step 6a in FIG. 6 by using the control circuit 31. Assume that a user operates the console unit 34 to perform a calling operation with respect to a wire telephone set (not shown) connected to the wire network NW. In this case, the control circuit 31 of the mobile station PSS5 checks in step 6b whether the respective time slots of the reception frequency of each speech radio frequency which the system possesses are free. That is, the control circuit 31 searches each speech radio frequency and each time slot for a free channel. Whether a time slot is free or not is determined in the following manner. The reception frequencies are set one by one in the frequency synthesizer 32. Waves are then received in units of time slots of each reception frequency, and their reception field strengths are detected by the reception field strength detector 33. These detection values are then compared with a preset determination level, thus determining the state of each time slot.

Assume, as shown in FIG. 5, that speech radio frequencies $f_{T1}$ and $f_{R1}$ are used to form speech channels between the base station BSS1 and six mobile stations PSS11 to PSS16 located within the radio zone E1 of the base station BSS1, speech radio frequencies $f_{T2}$ and $f_{R2}$ are used to form a speech channel between the base station BSS2 and one mobile station PSS21 located within the radio zone E2 of the base station BSS2, and speech radio frequencies $f_{T3}$ and $f_{R3}$ are used to form speech channels between the base station BSS3 and three mobile stations PSS31 to PSS33 located within the radio zone E3 of the base station BSS3. Note that the base stations BSS4 to BSSn and mobile stations in a waiting state other than the mobile station PSS5 are omitted from FIG. 5 for the sake of descriptive convenience.

Figure 7:
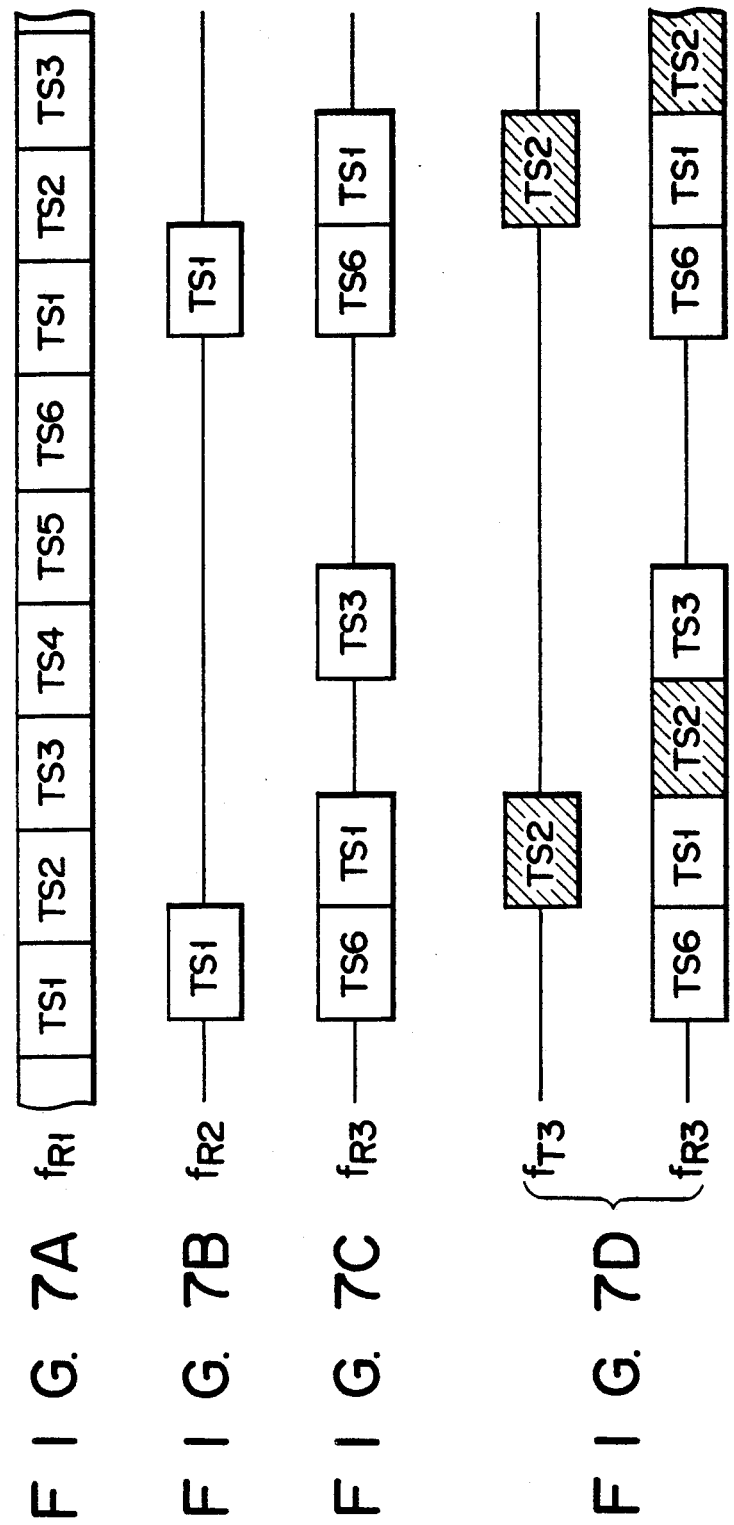
FIGS. 7A to 7D are timing charts for explaining the operation of the system.

With respect to the reception frequency $f_{R1}$, waves are detected in all the time slots TS1 to TS6, as shown in FIG. 7A. For this reason, it is determined that the frequency $f_{R1}$ cannot be used. With respect to the reception frequency $f_{R2}$, a wave is detected in only the time slot TS1, and no wave is detected in other time slots TS2 to TS6, as shown in, e.g., FIG. 7B. For this reason, it is determined that the time slot TS2 to TS6 are free. With respect to the reception frequency $f_{R3}$, waves are detected in the time slots TS1, TS3, and TS6, and no waves are detected in other time slots TS2, TS4, and TS5, as shown in, e.g., FIG. 7C. For this reason, it is determined that the time slots TS2, TS4, and TS5 are free. The determination results are stored in the data RAM 45 in the control circuit 31. In addition, the reception frequency in which the free time slots are detected are stored in the data RAM 45 together with their detected reception field strengths.

When the search for free channels is completed in this manner, the control circuit 31 of the mobile station PSS5 checks in step 6c from the result of the search whether any usable speech radio frequencies are present. If usable speech radio frequencies are present as in the case shown in FIG. 5, a frequency having a higher reception field strength is selected from the usable frequencies. The selected speech radio frequency is then set in the frequency synthesizer 32. At the same time, a free time slot is selected from the selected frequency, and the transmission timing of the mobile station PSS5 is synchronized with the selected time slot (step 6d).

Assume that the reception frequency $f_{R3}$ has a reception field strength higher than that of the reception frequency $f_{R2}$. In this case, the transmission frequency $f_{T3}$ as the counterpart of the reception radio frequency $f_{R3}$ having the larger reception field strength is selected and set in the frequency synthesizer 32. Of the free time slots TS2, TS4, and TS5 of the frequency $f_{T3}$, a proper time slot, e.g., the time slot TS2, is selected. The transmission time of the mobile station PSS5 is then synchronized with the time slot TS2. As a result, the transmission and reception timings of the mobile station PSS5 are set as shown in FIG. 7D. In step 6e, the control circuit 31 of the mobile station PSS5 generates a calling signal and transmits it to the base station BSS3 by using the time slot TS2 of the transmission frequency $f_{T3}$. That is, the calling signal is transmitted by using a speech channel as a control channel.

Meanwhile, the base station BSS3 is monitoring the arrival of a wave in the free time slots of the currently used speech radio frequency $f_{T3}$. If a wave arrives in this state, the base station BSS3 receives the wave. If the base station BSS3 recognizes the received signal as the calling signal from the mobile station PSS5, it generates a response signal destined to the mobile station PSS5, and sends the response signal to the mobile station PSS5 by inserting it in the time slot TS2 of the speech radio frequency $f_{R3}$.

After the calling signal is transmitted, the mobile station PSS5 monitors the arrival of the response signal from the base station BSS3 in step 6f while monitoring a time-out in step 6g. If the arrival of the response signal is recognized within a predetermined period of time after the calling signal is transmitted, the mobile station BSS3 transmits a dial signal and is subsequently set in a speech communication state with the time slot TS2 being continuously used. Note that if no response signal arrives within the predetermined period of time, the flow returns to step 6c to check whether any other usable time slots are present. If a usable time slot is present, a transmission timing based on this time slot is established to transmit a calling signal again.

Assume that it is determined in step 6c that no usable time slot is present. In this case, in the mobile station PSS5, the flow advances to step 6h to set a control radio frequency in the frequency synthesizer 32, and the use state of the set frequency is checked in step 6i. If it is determined that the control radio frequency is free, the flow advances to step 6j to generate a calling signal and transmit it to the corresponding base station by using the control radio frequency. After this calling signal is transmitted, the control circuit 31 monitors the arrival of a response signal in step 6k while monitoring a time-out in step 6l. If the response signal arrives within a predetermined period of time, the flow advances to step 6m. In step 6m, a free time slot is confirmed in accordance with speech channel information included in the response signal. When it is confirmed that the time slot is free, the corresponding speech radio frequency is set in the frequency synthesizer 32. At the same time, the transmission timing of the mobile station PSS5 is synchronized with the free time slot, and transmission of a dial signal and speech communication are subsequently performed.

As described above, according to this embodiment, when a calling request is generated, free time slots are searched in units of speech radio frequencies. When a speech radio frequency having a free time slot is found upon this search, transmission of a calling signal and reception of a response signal are performed by using the free time slot of this speech radio frequency. In this manner, a calling operation can be performed by using a free time slot of a speech radio frequency. Therefore, even if control traffic is high with frequent calling and ringing operations, the probability that a calling operation can be performed without a busy state can be increased, resulting in an increase in call completion rate.

In addition, since a calling operation can be performed without relying on only control radio frequencies, the number of control radio frequencies need not be increased. Therefore, the limited number of radio frequencies can be effectively used. Furthermore, since each control radio frequency has a time frame format, slot synchronization need not always be established. This prevents control processing in each base station and each mobile station from being complicated. Therefore, the circuit arrangements of the base and mobile stations can be simplified, and the apparatuses in the base and mobile stations can be reduced in size and weight. Such reductions in size and weight are very important to improve the portability of a portable telephone set.

Moreover, in this embodiment, when a calling operation is to be performed, a free time slot of a speech radio frequency is preferentially selected. That is, only when no free time slot is present, a control radio frequency is selected. Therefore, most calling control is performed by using free time slots of speech radio frequencies. For this reason, when transmission of a dial signal and a speech communication are to be performed after calling control is completed, switching from a control radio frequency to a free time slot of speech radio frequency need not be performed. Therefore, the time required for connection control can be shortened accordingly.

Another embodiment of the present invention will be described next. In the above-described embodiment, whether a speech time slot is free or not is determined by comparing a detected reception field strength with one determination level. In contrast to this, in this embodiment, determination of a free time slot is performed by using two determination levels A and B (A<B).

Figure 8:
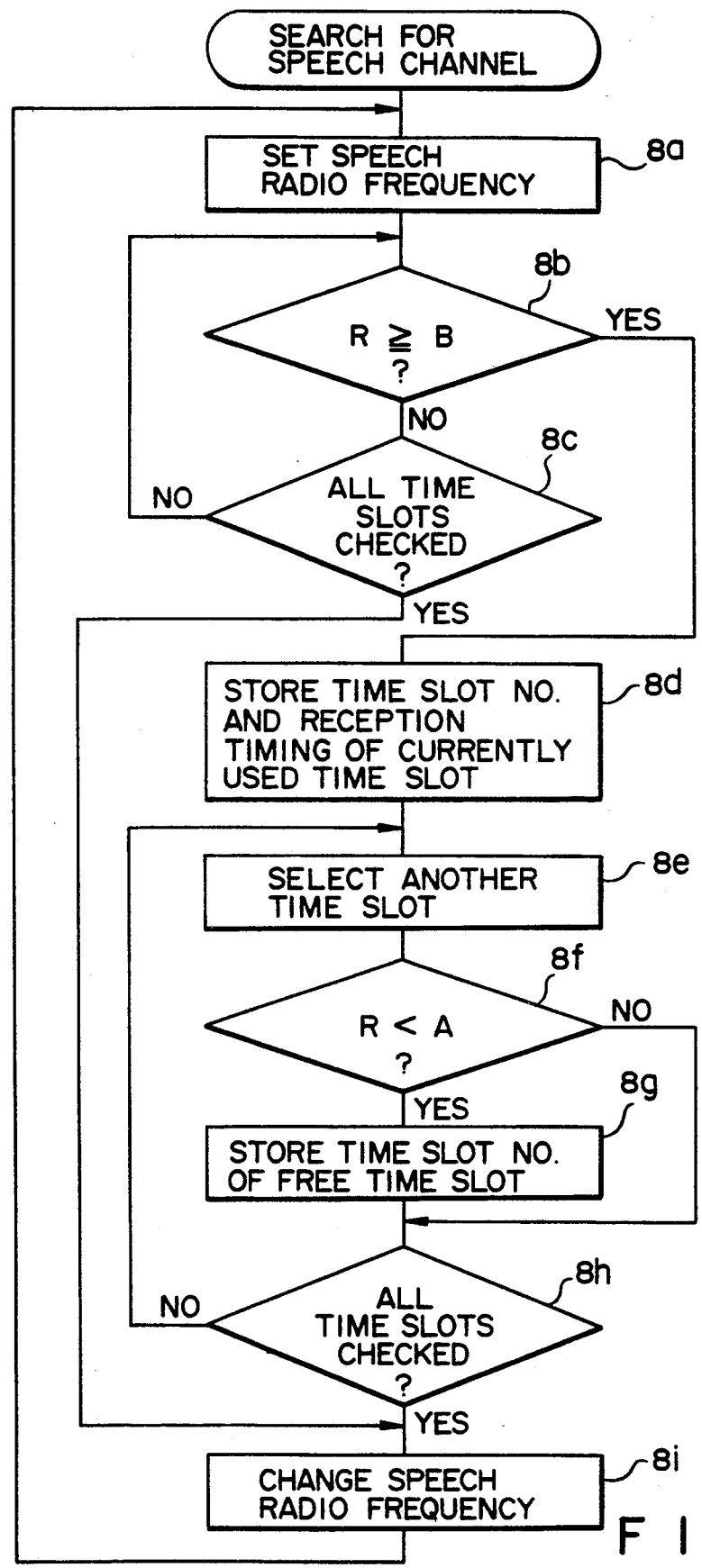
FIG. 8 is a flow chart showing the control sequence and contents of a control circuit of each base station.
Figure 9:
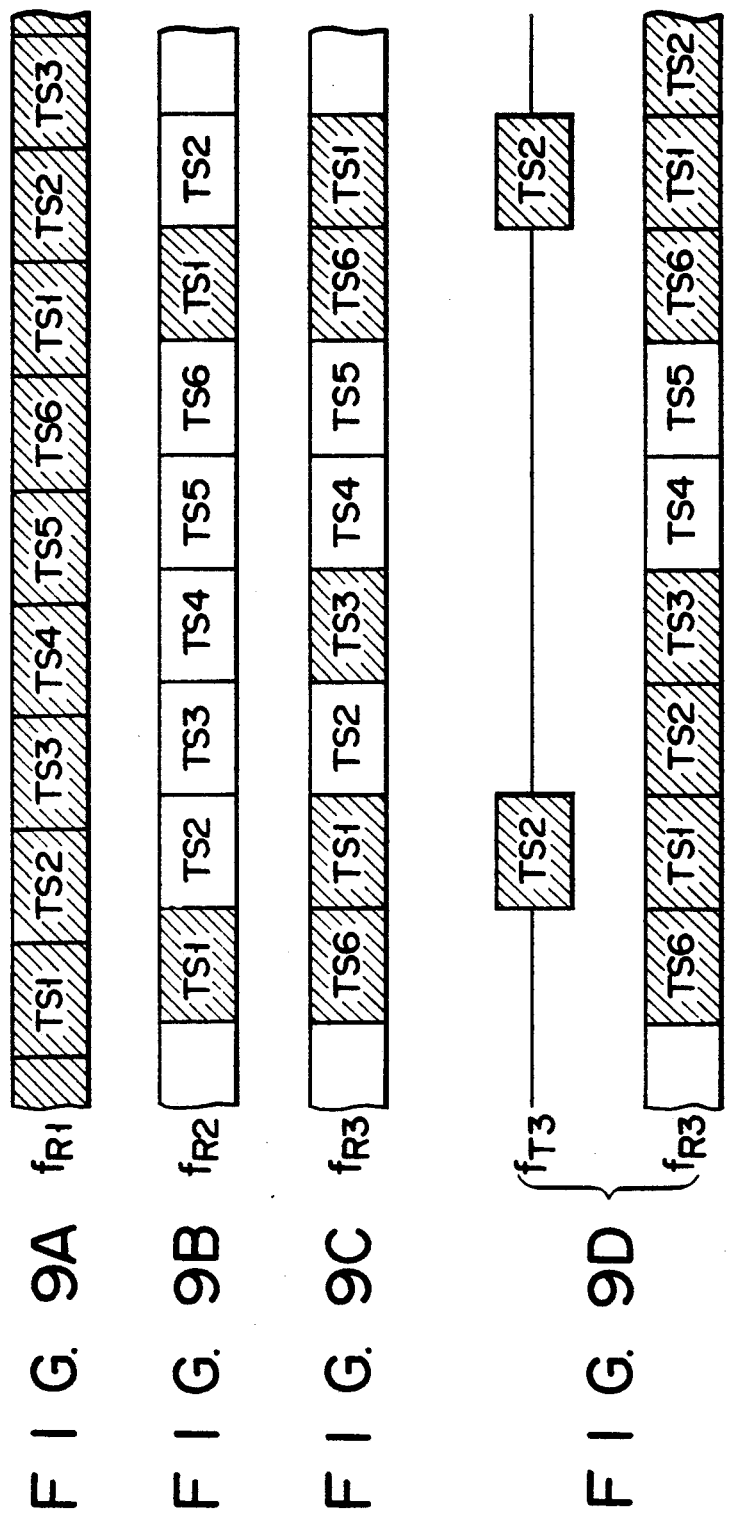
FIGS. 9A to 9D are timing charts for explaining another embodiment of the present invention.
Figure 10:
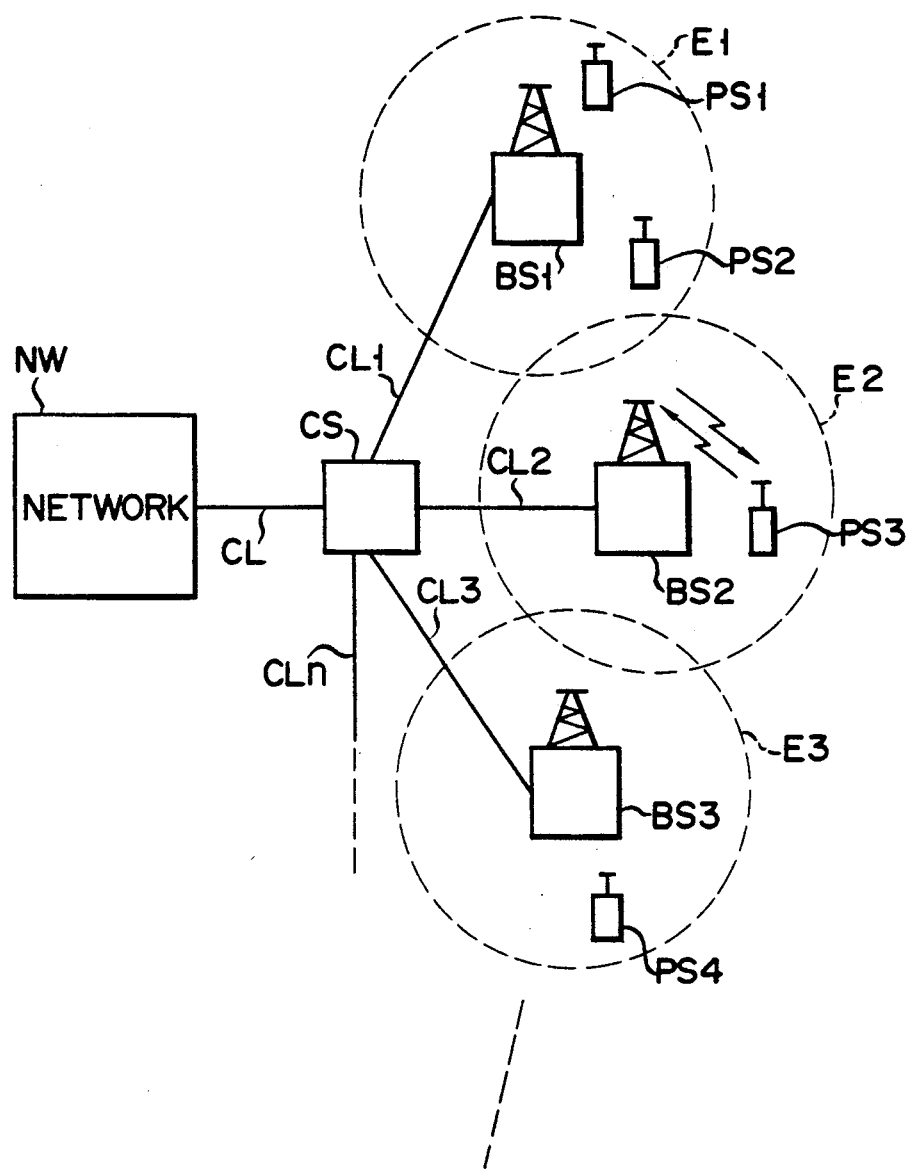
FIG. 10 is a block diagram showing an arrangement of a conventional radio portable telephone system.

The control circuit of each mobile station searches for a free time slot of a speech radio frequency in the following manner. FIG. 8 is a flow chart showing the control sequence of the control circuit.

In step 8a, the control circuit of each mobile station selects an arbitrary speech radio frequency and sets it in a frequency synthesizer. In step 8b, the control circuit checks whether a detection value R of a reception field strength in one of the time slots of the speech radio frequency is equal to or higher than the determination level B, i.e., whether $R \geq B$. If YES in step 8b, it is determined in step 8d that the time slot is currently used, and its time slot number and reception timing are written in the internal RAM of the control circuit. If NO in step 8b, it is checked in step 8c whether all the time slots (six slots) are checked. If NO in step 8c, the flow returns to step 8b to check $R \geq B$ for another time slot. If YES in step 8c, the flow advances to 8i to select another speech radio frequency, and the flow returns to step 8a to repeat the above-described control processing.

If a currently used time slot is found in step 8b, and its slot number and reception timing are stored in step 8d, the control circuit of each mobile station selects a time slot other the currently used time slot in step 8e. In step 8f, it is checked whether the detection value R of a reception field strength in the time slot is less than the determination level A, i.e., whether $R < A$. If $R < A$, it is determined that the time slot is free, and its slot number is written in the internal RAM. The flow then advances to step 8h. If $R \geq A$, it is determined that the time slot is currently used, and the flow advances to step 8h. In step 8h, it is checked whether all the time slots are checked. If NO in step 8h, the flow returns to step 8e to repeat the above-described control processing. If YES in step 8h, the flow advances to step 8i to select another speech radio frequency, and the flow returns to step 8a. Subsequently, detection of currently used time slots of another speech radio frequency and determination of free time slots of the speech radio frequency are performed. The above-described control processing is repeated a number of times corresponding to a predetermined number of speech radio frequencies.

If such search processing is performed, only a speech radio frequency having a currently used time slot with a reception field strength equal to or higher than the determination level B is selected from the respective speech radio frequencies, and only a time slot having a reception field strength less than the determination level A is selected from the time slots of the selected speech radio frequency to be stored, as a free time slot, in the data RAM of the control circuit. With this operation, a speech radio frequency having a relatively low reception field strength is removed even if reception of a wave at this radio speech frequency is confirmed. Only a speech radio frequency having a reception field strength higher than the determination level B, i.e., having a sufficiently high reception field strength is selected, and a free time slot of the selected speech radio frequency is used. Even if, therefore, a wave of the same speech radio frequency as that used in another base station arrives as an interference wave, a sufficiently high D/U can be ensured by selecting a wave having sufficiently high reception field strength as a desired wave. With this, highly reliable calling control can be performed.

The present invention is not limited to the above embodiments. For example, in each embodiment described above, a speech radio frequency is searched for a free time slot. If a free time slot is present, a calling operation is performed by using this time slot. If no free time slot is present, a calling operation is performed by using a control radio frequency. However, the use state of a control radio frequency may be determined first. If the control radio frequency can be used, a calling operation is performed by using this control radio frequency. Only if the control radio frequency cannot be used, a free time slot of a speech radio frequency may be selected to perform a calling operation.

In the system of each embodiment described above, each base station transmits a wave only in a currently used time slot but stops transmitting a wave in a free time slot. However, the present invention can be applied to a system in which a wave is transmitted even in a free time slot. In this case, reception frequencies $f_{R1}$, $f_{R2}$, and $f_{R3}$ transmitted from respective base stations have time frame formats shown in, e.g., FIGS. 9A to 9D which are different from those in FIG. 7A to 7D.

When the present invention is to be practiced in such a system, it is checked first from a detection result obtained by a reception field strength detector whether a speech radio frequency can be used, and the determination of a free time slot is performed in units of time slots by identifying the contents of reception data. In this case, if a bit for identifying a free time slot is inserted in data in each time slot, the determination of a free time slot is facilitated. Note that a transmission output in the free time slot need not be set to be the same as that in the currently used time slot but may be set to be smaller. This is because the transmission output required to decode data to simply check whether a time slot is currently used can be set to be smaller than the transmission output required to properly decode data during communication.

In each embodiment described above, a search for a free time slot is performed by detecting a reception field strength itself. However, the determination of a free time slot may be performed by detecting information corresponding to a reception field strength by using a circuit for detecting a bit error rate or the like of, e.g., a noise squelch circuit or reception data.

Furthermore, in each mobile station, information representing a search result of a free time slot of a speech radio frequency may be inserted in a calling signal to be sent to a corresponding base station. With this operation, in the base station, whether a currently used speech radio frequency is adequate can be confirmed by collating a result based on a search in the base station with the search result obtained by the mobile station. If it is not adequate, a more adequate speech radio frequency may be selected to perform calling control again or the currently used speech radio frequency may be switched to another frequency when the calling mode is shifted to the speech mode.

In addition, the ID code of the base station may be inserted in a currently used speech time slot so that the ID code is detected by the mobile station and is inserted in a calling signal to be transmitted. With this operation, the base station can clearly detect that the calling signal is destined to the self-station, thus allowing accurate calling control.

In each embodiment described above, for the sake of descriptive convenience, it is assumed that each base station has a transmitter/receiver pair, and transmission and reception are simultaneously performed using a single speech radio frequency. However, the present invention can be applied to a system wherein a plurality of transmitter/receiver pairs are arranged in each base station and each base station communicates with different mobile stations by using a plurality of speech radio frequencies at the same time.

Furthermore, in each embodiment described above, the determination of a usable speech radio frequency is based on a reception field strength only in one currently used time slot. If, however, a plurality of currently used time slots are present, the determination of a usable frequency may be performed by obtaining the average level of reception field strengths in these time slots.

In each embodiment described above, the determination levels for searching free time slots of a speech radio frequency are fixed to predetermined levels. However, such determination levels may be set to be variable in accordance with various conditions such as the reception field strength of a wave or of an interference wave.

In each embodiment described above, a portable radio telephone system is exemplified. However, the present invention ma be applied to other radio speech communication systems such as a vehicle radio telephone system and a cordless telephone system. In addition, the present invention may be applied to a data transmission system such as a tele-terminal system or a system for transmitting facsimile image data or a video signal.

Moreover, in each embodiment described above, only a signal transmitted at a speech radio frequency has a time frame format. However, a signal transmitted at a control radio frequency may have a time frame format.

With regard to other features, such as the arrangement of the system, the circuit arrangements of mobile and base stations, and the control sequence and contents of the control circuit, various changes and modifications can be made within the spirit and scope of the invention.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims and their equivalents.

What is claimed is:

1. A radio tele-communication system comprising:
 a plurality of base stations connected to a network through wire lines, respectively;
 a plurality of mobile stations connected to said base stations through radio channels;
 a plurality of speech radio frequencies and at least one control radio frequency being shared by said base and mobile stations;
 a signal transmitted at the speech radio frequencies being formatted such that each time frame is constituted by a plurality of time-divisionally multiplexed time slots; and
 each of said mobile stations including;
  first free state determining means for checking whether the control radio frequency can be used;

second free state determining means for checking whether each time slot of the plurality of speech radio frequencies is free; and calling control means for performing a calling operation by selecting a radio channel used for the calling operation from free time slots of the plurality of speech radio frequencies and the control radio frequency on the basis of determination results from said first and second free state determining means.

2. A system according to claim 1, wherein if said second free state determining means determines that a free time slot is present, said calling control means performs a calling operation by selecting the free time slot, and if said second free state determining means determines that no free time slot is present, said calling control means performs a calling operation by selecting the control radio frequency.

3. A system according to claim 1, wherein if said first free state determining means determines that the control radio frequency can be used, said calling control means performs a calling operation by selecting the control radio frequency, and if said first free state determining means determines that the control radio frequency cannot be used, said calling control means performs a calling operation by selecting a free time slot determined by said second free state determining means.

4. A system according to claim 1, wherein said second free state determining means selects a speech radio frequency having a currently used time slot with a reception field strength not less than a preset first determination level from the plurality of speech radio frequencies, and selects a time slot having a reception field strength less than a second determination level below the first determination level, as a free time slot, from time slots of the selected speech radio frequency.

5. A system according to claim 4, wherein if said second free state determining means detects a plurality of speech radio frequencies having currently used time slots whose reception field strengths are not less than the first determination level and free time slots whose reception field strengths are less than the second determination level, said calling control means performs a calling operation by selecting a free time slot of a speech radio frequency having the highest reception field strength from the detected speech radio frequencies.

6. A system according to claim 1, wherein if a calling operation is performed by using a free time slot of a selected speech radio frequency or the control radio frequency, said calling control means transmits part or all of free state determination results obtained by said first and second free state determining means to said base station.

7. A mobile station apparatus used in a radio tele-communication system including a plurality of base stations connected to a network through wire lines, respectively, and a plurality of mobile stations connected to said base stations through radio channels, a plurality of speech radio frequencies and at least one control radio frequency being shared by said base and mobile stations, and a signal transmitted at the speech radio frequencies being formatted such that each time frame is constituted by a plurality of time-divisionally multiplexed time slots, comprising:

first free state determining means for checking whether the control radio frequency can be used;

second free state determining means for checking whether each time slot of the plurality of speech radio frequencies is free; and calling control means for performing a calling operation by selecting a radio channel used for the calling operation from free time slots of the plurality of speech radio frequencies and the control radio frequency on the basis of determination results from said first and second free state determining means.

8. An apparatus according to claim 7, wherein if said second free state determining means determines that a free time slot is present, said calling control means performs a calling operation by selecting the free time slot, and if said second free state determining means determines that no free time slot is present, said calling control means performs a calling operation by selecting the control radio frequency.

9. An apparatus according to claim 7, wherein if said first free state determining means determines that the control radio frequency can be used, said calling control means performs a calling operation by selecting the control radio frequency, and if said first free state determining means determines that the control radio frequency cannot be used, said calling control means performs a calling operation by selecting a free time slot determined by said second free state determining means.

10. An apparatus according to claim 7, wherein said second free state determining means selects a speech radio frequency having a currently used time slot with a reception field strength not less than a preset first determination level from the plurality of speech radio frequencies, and selects a time slot having a reception field strength less than a second determination level below the first determination level, as a free time slot, from time slots of the selected speech radio frequency.

11. An apparatus according to claim 10, wherein if said second free state determining means detects a plurality of speech radio frequencies having currently used time slots whose reception field strengths are not less than the first determination level and free time slots whose reception field strengths are less than the second determination level, said calling control means performs a calling operation by selecting a free time slot of a speech radio frequency having the highest reception field strength from the detected speech radio frequencies.

12. A radio tele-communication system comprising:

a plurality of base stations connected to a network through wire lines, respectively;

a plurality of mobile stations connected to said base stations through radio channels;

a plurality of speech radio channels and at least one control radio channel being shared by said base and mobile stations; and each of said mobile stations including;

first free state determining means for checking whether the control radio frequency can be used;

second free state determining means for checking whether a free channel is present in the plurality of speech radio channels; and calling control means for performing a calling operation by selecting a radio channel used for the calling operation on the basis of determination results from said first and second free state determining means.

* * * * *